(12) United States Patent
Robertson

(10) Patent No.: US 6,623,642 B2
(45) Date of Patent: Sep. 23, 2003

(54) SYSTEM FOR REMOVING PHOSPHORUS FROM WASTE WATER

(75) Inventor: William Dean Robertson, Waterloo (CA)

(73) Assignee: Centre for Research in Earth and Space Technology, North York (CA)

( * ) Notice: Subject to any disclaimer, the term of this patent is extended or adjusted under 35 U.S.C. 154(b) by 132 days.

(21) Appl. No.: 09/800,656

(22) Filed: Mar. 8, 2001

(65) Prior Publication Data

US 2001/0023849 A1 Sep. 27, 2001

(30) Foreign Application Priority Data

Mar. 17, 2000 (GB) .............................................. 0006552

(51) Int. Cl.[7] ................................................ C02F 3/04
(52) U.S. Cl. ..................... 210/617; 210/631; 210/714; 210/721; 210/724; 210/747; 210/151; 210/170; 210/199; 210/203; 210/206; 210/532.2; 210/903; 210/906
(58) Field of Search ................................ 210/615–617, 210/631, 702, 714, 721, 724, 726, 679, 683, 747, 150, 151, 199, 202, 170, 203, 206, 532.2, 903, 906, 620

(56) References Cited

U.S. PATENT DOCUMENTS

| | | | |
|---|---|---|---|
| 4,707,270 A | 11/1987 | Kobayashi et al. | 210/683 |
| 4,793,929 A | 12/1988 | Kickuth et al. | 210/602 |
| 4,994,429 A | 2/1991 | Wieserman et al. | 502/401 |
| 5,514,281 A | 5/1996 | Boos et al. | 210/645 |
| 5,665,241 A | 9/1997 | Maeda et al. | 210/683 |
| 5,759,401 A | 6/1998 | Boussely et al. | 210/605 |
| 5,833,856 A | 11/1998 | Liu et al. | 210/605 |
| 5,846,426 A | 12/1998 | Boos et al. | 210/645 |
| 5,853,589 A | 12/1998 | Desjardins et al. | 210/605 |
| 5,869,722 A | 2/1999 | Kleiner | 556/174 |
| 5,876,606 A | 3/1999 | Blowes et al. | 210/679 |
| 5,888,404 A | 3/1999 | Jokinen | 210/711 |
| 5,897,784 A | 4/1999 | Mills | 210/705 |

FOREIGN PATENT DOCUMENTS

| | | |
|---|---|---|
| GB | 1 406 839 | 9/1972 |
| GB | 1 584 373 | 8/1977 |
| JP | 55106595 | 8/1980 |
| JP | 58109193 | 6/1983 |
| JP | 59090690 | 5/1984 |
| JP | 3114587 | 5/1991 |

OTHER PUBLICATIONS

Development of steady–state phosphate concentrations in septic system plums, Journal of Contaminant Hydrology, Mar. 1995.
Review of phosphate mobility and persistence in 10 septic system plumes, vol. 36, No. 6 Ground Water, Nov.–Dec. 1998.

*Primary Examiner*—Peter A. Hruskoci
(74) *Attorney, Agent, or Firm*—Anthony Asquith & Co.

(57) ABSTRACT

Phosphate-contaminated water passes through a domestic sewage treatment system, in which oxidation of the ammonium progresses far enough to cause a lowering of the pH to 5 or less. The water is passed over sand grains coated with aluminum hydroxide (gibbsite). Enough $Al^{3+}$ ions enter solution, at the low pH, to cause all the phosphate-P to precipitate as aluminum phosphate, and nothing else precipitates other than the aluminum phosphate.

16 Claims, 2 Drawing Sheets

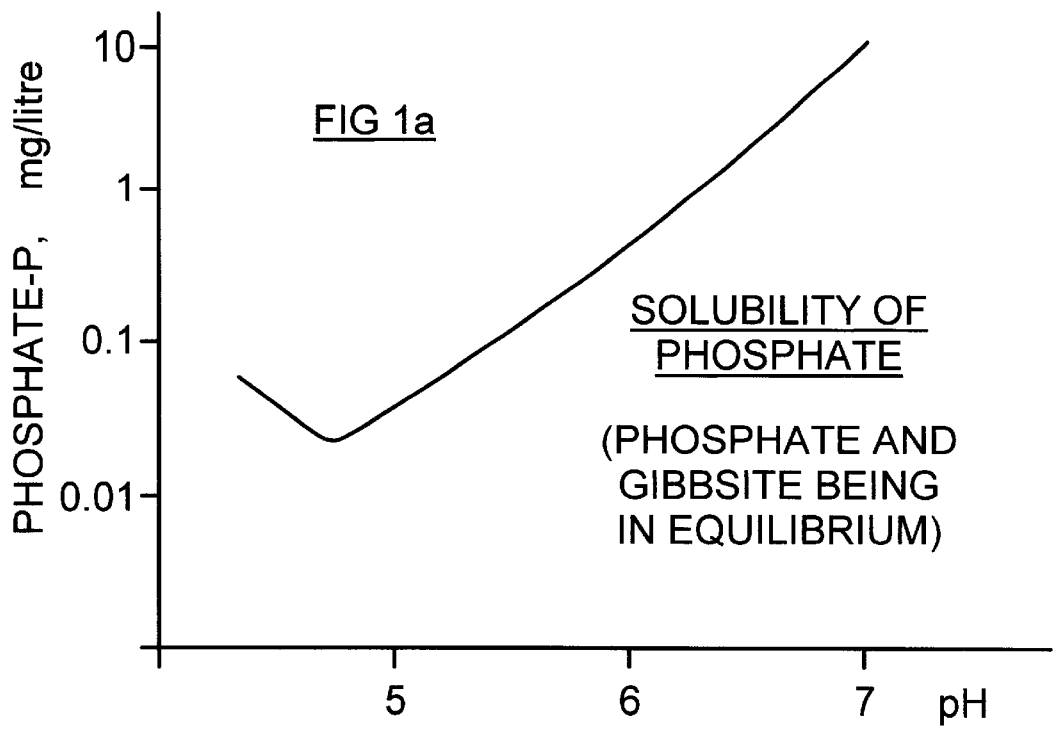
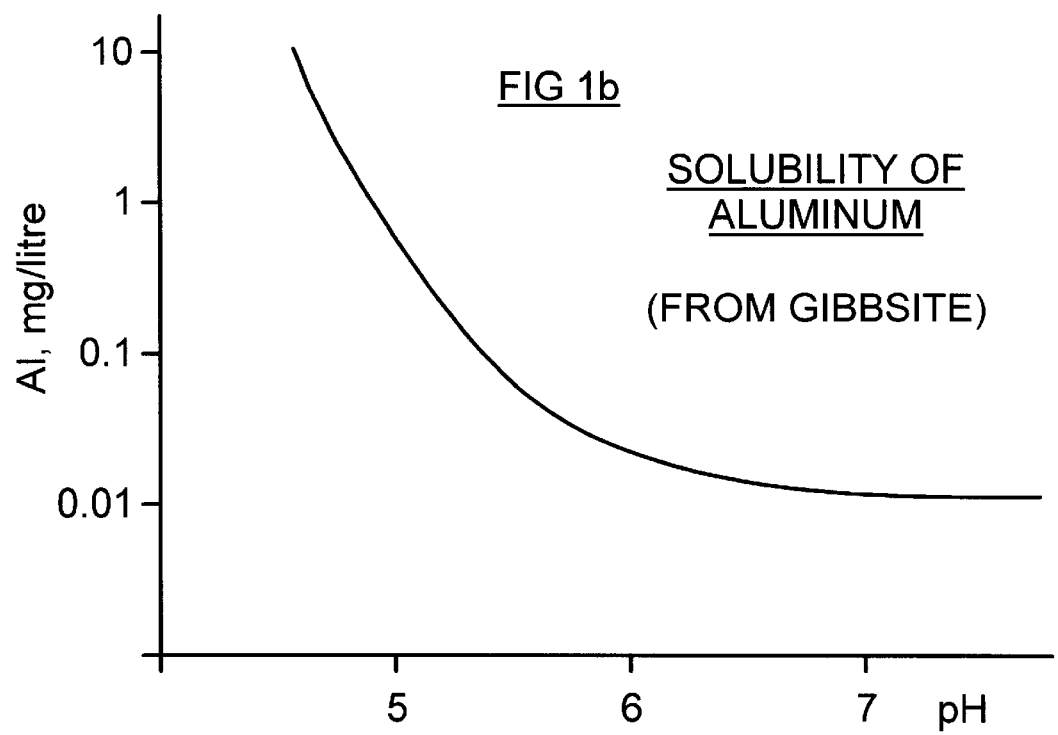

SYSTEM FOR REMOVING PHOSPHORUS FROM WASTE WATER

Discharged domestic wastewater often contains phosphorus, in the form of dissolved phosphate, arising from household detergents, etc. Dissolved phosphate is a problem because, in a body of open water (e.g a lake), it can lead to blooms of algae, to the detriment of other life-forms.

In some cases, the limitation on the number of dwellings that can be permitted around a lake is defined by the phosphorus in the effluents from the dwellings. It is becoming common for authorities to impose levels for P-content, in discharged water, typically at 1 mg/liter, or less. Indeed, maximum permitted levels of 0.3 mg/liter are becoming standard.

BACKGROUND TO THE INVENTION

As is well-known, one way by which dissolved phosphate can be taken out of solution in wastewater is by adsorption of the phosphate onto a suitable sorbing medium. The present invention is not concerned with adsorption, but with taking the phosphorus out of the water by mineral precipitation reactions. In the invention, the aim is to convert the dissolved phosphate, by chemical reaction, into an insoluble solid, which precipitates.

It has been conventional, in some municipal sewage treatment plants, to address the problem of an excessive P content by dumping bags of alum into the water. The alum serves as a source of aluminum sulphate. Alum is very soluble. When the alum enters the water, $Al^{3+}$ and $SO_4^{2-}$ ions quickly enter solution. The dissolved $Al^{3+}$ ions combine with any phosphate $PO_4^{3-}$ ions that might be present, to form aluminum phosphate. Under the conditions of (approximately) neutral pH likely to be encountered in a sewage treatment system, the aluminum phosphate is insoluble, and precipitates. The precipitant may comprise the mineral variscite, $AlPO_4.2H_2O$.

The use of alum can be effective to drive down the phosphate-P content to 1 mg/liter, or less. However, one problem with the use of alum is that dissolved $Al^{3+}$ ions do not remain in solution for long. The $Al^{3+}$ ions have an affinity for phosphate, and so the phosphate $PO_4^{3-}$ ions that happen to lie close to the point at which the alum enters the water react with the dissolved aluminum $Al^{3+}$ ions, as desired, to form aluminum phosphate, which precipitates; however, the dissolved $Al^{3+}$ ions from the sulphate which do not immediately pick up phosphate $PO_4^{3-}$ ions, soon tend to react with the water, and to form aluminum hydroxide. Aluminum hydroxide, $Al(OH)_3$, like the aluminum phosphate, is also insoluble at normally-encountered pH levels, so the hydroxide, too, precipitates, generally in the form of the mineral gibbsite.

The problem with putting alum into the water, to take out the phosphate, is that alum is very soluble, and the alum dissolves too quickly; but only a few of the many $Al^{3+}$ ions that enter the water actually reach, and react with, the phosphate ions to precipitate as aluminum phosphate; the remainder of the large quantity of aluminum ions that enter solution precipitate out as aluminum hydroxide (gibbsite). Because so many of the $Al^{3+}$ ions from the alum precipitate as the hydroxide before they can react with a phosphate ion, a large excess of alum is generally needed, in order to draw a given concentration of phosphate out of solution, by precipitating aluminum phosphate.

Thus, the technique of treating water contaminated with phosphorus by adding alum to the water results in the unwanted precipitation of large quantities of gibbsite (aluminum hydroxide). Besides, adding alum is labour-intensive; because alum dissolves quickly, the bags have to be added one at a time at regular intervals, rather than just once as a large volume that would last for a long period.

In a municipal sewage plant, at least the inconvenience associated with the use of alum can be managed, and it is conventional, in municipal plants, to treat phosphorus by adding alum to the water. But when it comes to domestic water treatment systems, e.g single-dwelling septic-tank systems, of course it is out of the question, as a practical system for treating excess phosphorus, to expect householders, every few days, to add a bag of alum into the water emerging from the septic-tank.

Gibbsite is (almost) insoluble, and, in the municipal systems, the large volumes of excess gibbsite precipitate as a flocculant in the sewage treatment. This adds to the sludge produced by the plant, which is a nuisance. It is recognised that, because alum is so soluble, though suitable as a treatment material for use in municipal systems, is only marginally suitable for use in domestic systems.

On the other hand, the ion-association reaction, in which dissolved phosphate $PO_4^{3-}$ combines with dissolved aluminum $Al^{3+}$ to form aluminum phosphate, is indeed an effective reaction for getting rid of the phosphate. The aluminum reaction is advantageous because aluminum phosphate is highly insoluble, and precipitates out of the water rapidly. The concentration of dissolved phosphate in the water can easily be reduced to 1 mg/liter, or less, when this reaction is able to take place properly and fully.

The invention is aimed at focussing the aluminum ion-precipitation reaction more efficiently onto the phosphate, whereby the phosphate can be precipitated, without the unwanted precipitation of large excess quantities of other unwanted minerals.

It is recognised that the ion-exchange reaction can be made to work with metals other than aluminum, but the aluminum reaction is the most economically practicable, and the invention is described herein as it relates to the aluminum reaction.

The invention is aimed at treating phosphorus by providing conditions for the ion-exchange reaction to take place, economically, and in a manner that requires little by way of on-going attention or maintenance. In particular, it is an aim of the invention to provide a phosphorus treatment system which requires no more attention than a conventional septic tank system. To be acceptable in a domestic water treatment context, a phosphorus treatment system must not require the householder to add a bag of treatment material into the water every few days; nor must it require the householder to clean out accumulated deposits of precipitated minerals. For the system to be acceptable, the service and maintenance demands should be compatible with those of a domestic septic tank water treatment system, i.e no more than once every year or two.

This is not to say that the invention is restricted only to domestic wastewater systems. It is recognised that the invention is suitable for use generally, in cases where the wastewater containing the dissolved phosphorus also contains dissolved ammonium.

THE GENERAL FEATURES OF THE INVENTION

It is known that the solubility of aluminum hydroxide (gibbsite) increases as the pH of the water decreases. For example, a typical septic-tank wastewater effluent, when at a neutral pH, has a solubility of aluminum hydroxide of only about 0.01 milligrams per liter; whereas, once the pH drops below about 5.5, the solubility of aluminum hydroxide in otherwise the same water increases sharply. The solubility of aluminum hydroxide reaches 1 mg/l at a pH of about 4.8, and 10 mg/l at a pH of about 4.5.

The invention involves creating the conditions whereby the pH of the phosphorus-contaminated water is lower than about 5.5, and preferably lower than about 5. It is recognised, in the invention, that when the pH has dropped to this low value, now the source of the $Al^{3+}$ ions needed for the formation and precipitation of aluminum phosphate can be aluminum hydroxide (gibbsite). Thus, instead of gibbsite being the insoluble substance that, unfortunately, precipitates in large quantities following the introduction of excessive quantities of aluminum sulphate (alum) into solution, now, at the low pH, gibbsite is soluble enough, itself, to serve as the source of the $Al^{3+}$ ions. As the water becomes acidic, more gibbsite dissolves, and more $Al^{3+}$ ions go into solution; if phosphate is present in the water, the $Al^{3+}$ ions have an affinity for the phosphate, and aluminum phosphate precipitates.

If the pH does not fall far enough, not enough $Al^{3+}$ ions (from the gibbsite) will enter solution, and there will not be enough dissolved $Al^{3+}$ ions to deal with all the dissolved phosphate. It is, however, possible for the pH to fall too far, whereby too much of the gibbsite would dissolve; in that case, the result would be that the phosphate would be dealt with very effectively, but now there would be an excess of $Al^{3+}$ ions in solution, because not all the $Al^{3+}$ ions would be taken up by the phosphate $PO_4^{3-}$ ions, and be precipitated as aluminum phosphate. Thus, if the pH drops too far, too much $Al^{3+}$ will remain in solution. (The excess $Al^{3+}$ in solution will eventually precipitate out, once again as gibbsite, if and when the pH of the water later becomes more neutral). Theoretically, there is a level of pH at which the concentration of $Al^{3+}$ that enters solution is just enough to precipitate all the phosphate. It is recognised that this level is around pH=5.5. It is also recognised that it is better to err on the side of too much $Al^{3+}$ than too little, in that an excess of aluminum in the water is an inconvenience, whereas an excess of phosphate is a contaminant.

When the pH was neutral, the solubility of aluminum hydroxide was very low; therefore, any $Al^{3+}$ ion that did not immediately react with a phosphate ion would not remain in solution, but would precipitate out as aluminum hydroxide. But when the pH is low, the solubility of aluminum hydroxide being now high, now many of the $Al^{3+}$ ions that do not immediately react with phosphate ions can remain in solution until a phosphate ion becomes available.

Ideally, just enough $Al^{3+}$ ions should be released into solution as will deal with all the phosphate ions (i.e as will precipitate all the phosphate as aluminum phosphate). If not enough $Al^{3+}$ is present, not all the phosphate will be dealt with; if too much $Al^{3+}$ is present, the excess will remain in solution while the pH remains low, but will start to precipitate out, as gibbsite, when the pH rises.

It is recognised that the pH should not be driven too low—that is to say, below about 4.5—because at that very low pH, the solubility of aluminum hydroxide (gibbsite) now exceeds 20 milligrams per liter, which is far more than can be used up dealing with the dissolved phosphate.

Effluent water from a septic tank system, if it is contaminated with phosphate, contains typically 10 mg/l of phosphate-phosphorus. The water will usually have been at roughly neutral pH when picking up the phosphate, and while passing through the septic tank system, and the solubility of the phosphate-producing substances is around 10 mg/l at neutral pH.

The solubility of aluminum phosphate in fact goes down as the pH goes down, reaching a minimum of about 0.02 mg/liter at a pH of about 4.7. Thus, as the pH drops, the solubility of aluminum hydroxide increases, whereby more $Al^{3+}$ ions are available in solution to react with (i.e to cause precipitation of) the dissolved phosphate; and at the same time, the solubility of aluminum phosphate decreases, whereby aluminum phosphate is urged even more strongly out of solution and into precipitation.

If effluent water from a septic tank system, contaminated with 10 mg/l of phosphate-P, is driven down to a low pH, and is then passed over or through a body of aluminum hydroxide, in the manner as described herein, it can be expected that the phosphate-P content will drop to below 1 mg/l. Some jurisdictions require the water to contain no more than 0.3 mg/l, and the invention is capable of enabling even this degree of remediation to be attained, if the natural conditions are favourable and if the engineered conditions are done carefully and properly.

It should be noted that the body of aluminum hydroxide (gibbsite) does not all quickly dissolve. Thus, a large body of gibbsite can be provided, at first, and that body will remain in place, as a body, for a long period. Provided the pH does not fall too low, the amount of aluminum hydroxide needed to saturate the water, even though the solubility thereof is greater than it was at neutral pH, is still small, whereby a body of aluminum hydroxide will last a long time before it dissolves away. (This may be contrasted with the aluminum sulphate treatment system: the sulphate was so soluble that a large bagful dumped in the water would be completely dissolved in a few hours.)

One requirement of the invention, as mentioned, is that the pH of the water must be driven down to below about 5.5. In a sewage treatment system (domestic or municipal), ammonium is oxidized to nitrate; it is recognised that, at least in some types of effluent water, the pH can be driven down to below 5.5 simply be ensuring that the normal process of oxidation of the ammonium is fully completed. The normal oxidation reaction is:

$$NH_4^+ + 2O_2 \rightarrow NO_3^- + 2H^+ + H_2O$$

Generally, in sewage systems, it does not matter if a few percent of the ammonium has not been oxidized into nitrate, when the water is discharged from the treatment system. It will (usually) oxidize naturally later on. However, sometimes, complete oxidation of all the ammonium does take place, and it is known, in such instances, that the pH suddenly starts to drop, as the last few percent of the ammonium are consumed. Then, effluent water that has undergone a complete oxidation of ammonium has been observed to have a pH as low as 4.5 or even 4.

Oxidation of the ammonium takes place in the aerobic station of the water treatment system. Of course, complete oxidation can be procured simply by making the aerobic station large enough, and efficient enough. However, as mentioned, usually the designers of a sewage treatment plant (municipal or domestic) are not concerned to remove every last molecule of ammonium, and aerobic treatment stations, generally, are not good enough to achieve the degree of completeness of oxidation that is required to drive the pH down to the levels at which gibbsite can be used as the source of the aluminum to precipitate the phosphate. Of course, some (perhaps over-engineered) aerobic treatment stations in the past have been such as to cause complete oxidation of the ammonium, and in such cases, it has been observed that the pH does indeed drop to the low values, as described.

Gibbsite is a naturally occurring substance in many types of soil, and it has been noted that, when the acidity of a body of water reaches the 5 or 4.5 area (which can happen, for example, in a lake via the "acid rain" mechanism), the concentration of dissolved gibbsite does increase markedly. One of the reasons acidity is damaging to lake life is that the dissolved gibbsite tends later to precipitate (fatally) on the gills of fish.

Thus, it is known (a) that the pH of sewage treatment water tends to fall sharply when and if the ammonium undergoes more or less complete oxidation, and (b) that the solubility of gibbsite increases as the pH falls. What has not previously been understood is that these facts can lead to a practicable, economical treatment system for alleviating phosphorus from sewage water, being a water treatment system which involves engineering the conditions in which complete oxidation is procured, and which at the same time involves providing a source of gibbsite and passing the completely oxidized water over or through the gibbsite.

In the invention, the phosphorus-containing water that has been fully oxidized, and is of low pH, is passed over or through a body of gibbsite. Of course, the body of gibbsite must be engineered to be porous and permeable to the passage of water therethrough. One way in which this can be done is by applying a coating of gibbsite to grains of sand, and using the coated sand as the permeable body. The water takes the aluminum hydroxide into solution as it passes over and between the coated grains. The lower the pH of the water passing through the coated sand grains, the greater the concentration of aluminum hydroxide in the water.

In fact, it may be noted that, if the pH of the water passing over the coated sand grains were not indeed low, very little of the aluminum hydroxide would pass into solution. In other words, the passing water will only take up so much of the aluminum hydroxide into solution as is enabled by the pH level of the passing water. This means that the grains of sand that are coated with aluminum hydroxide can serve as the sand that is to comprise the basis of the aerobic treatment station. As the water passes through the sand, so the oxidation of the ammonium proceeds: at first, the oxidation is incomplete, and very little of the aluminum hydroxide is taken up; then, as oxidation is completed, the pH drops, and more and more of the aluminum hydroxide on the grains is taken up, into solution.

It should also be noted that, sometimes, water being treated in a sewage treatment plant might contain minerals, such as limestone, which buffer the acidity. In these cases, the presence of the minerals might prevent the pH from dropping below neutral levels, even when the ammonium has been thoroughly oxidized. Thus, the invention is unsuitable for use in alleviating phosphorus from hard water, i.e from water which contains enough buffering minerals to prevent the pH from dropping down to the low levels as described.

In this connection, also, the designer of the treatment system should see to it that the aerobic station of the treatment system in which the oxidation is to take place, does not itself introduce buffering minerals. If the aerobic station uses sand/gravel, or the like, such sand/gravel must be free of limestone, etc. If the local sand at the site is not substantially limestone-free, that local sand is not suitable for use in a phosphorus alleviation plant of the kind as described herein.

DETAILED DESCRIPTION OF PREFERRED EMBODIMENTS

By way of further explanation of the invention, exemplary embodiments of the invention will now be described with reference to the accompanying drawings, in which:

FIG. 1a is a graph showing pH-related changes in water-solubility of aluminum phosphate.

FIG. 1b is a corresponding graph showing pH-related changes in water-solubility of aluminum hydroxide.

Figure 2:
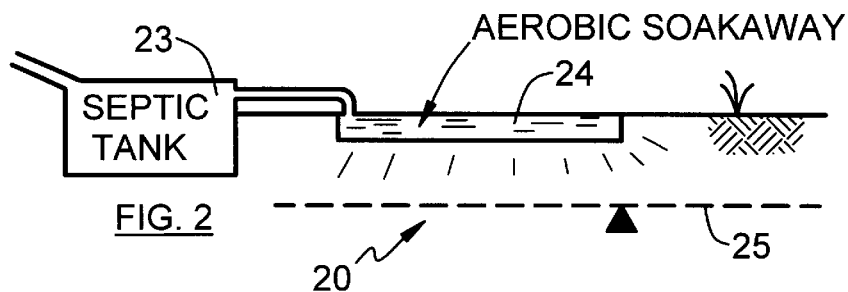
FIG. 2 is a diagram of a simple conventional domestic sewage water treatment system, having no means for alleviating phosphorus.

The apparatuses shown in the accompanying drawings and described below are examples which embody the invention. It should be noted that the scope of the invention is defined by the accompanying claims, and not necessarily by specific features of exemplary embodiments.

In the preferred form of the invention, the metal that will cause the phosphate to precipitate is aluminum, and the source of the $Al^{3+}$ ions is aluminum hydroxide, gibbsite.

Generally, aluminum hydroxide would be regarded as too insoluble to serve as a useful source of $Al^{3+}$ ions, and this is true under many conditions encountered in conventional wastewater treatment systems. Using gibbsite would be generally regarded as not effective to get the phosphate-P level down to less than about 10 mg/l, on the grounds that the hydroxide is too insoluble to release an effective concentration of $Al^{3+}$ ions into the water.

However, as described, when the pH of the water falls below about 5.5, and especially when it falls below 5, the solubility of gibbsite increases sharply. That is to say, if gibbsite is present in water, and the water goes to a low pH, the quantity of $Al^{3+}$ ions that pass into solution in the water will increase.

Where there is phosphate dissolved in the water, the phosphate ions will immediately react with such aluminum ions, if any are present, dissolved in the water, to form insoluble aluminum phosphate. If enough $Al^{3+}$ ions are present in the water, (nearly) all of the phosphate ions in the water can be caused to precipitate out as aluminum phosphate. At low pH, the increased concentration of gibbsite, which dissolves at low pH, precipitates straight out again as aluminum phosphate. In other words, if only the pH can be lowered to about 5.5, or less, the gibbsite can serve as an adequate source for getting enough $Al^{3+}$ ions into solution to drive the concentration of phosphate down to below the 1 mg/liter level.

FIG. 1a shows the changes in the solubility of Al in aluminum hydroxide (gibbsite), with changes in pH. As can be seen, at pH=7, i.e at neutral conditions, gibbsite is almost insoluble. That is to say, at pH=7, gibbsite cannot dissolve to a sufficient concentration for the dissolved aluminum to have any significant effect on the phosphate content. At pH=5, on the other hand, the concentration of dissolved gibbsite-Al reaches 0.5 mg/liter, at which Al ions can now enter solution at a large enough rate to make an impact on the phosphate.

FIG. 1b shows the changes in the solubility of $PO_4$ in aluminum phosphate (variscite), with changes in pH. The FIG. 1b graph assumes equilibrium with aluminum hydroxide (gibbsite). At pH=7, variscite, $Al(PO_4) \cdot 2H_2O$, can remain in solution up to a concentration of 10 mg/l, or even more, assuming equilibrium conditions with the gibbsite, i.e assuming that the only source of Al ions in the water is those that have dissolved from the gibbsite. However, as the pH drops, the solubility of variscite also drops. At pH=5.5, the concentration of phosphate-P that can remain in solution is about 0.1 mg/liter. At pH=5, the concentration of phosphate-P that can remain in solution is only about 0.03 mg/liter. These being theoretical numbers, preferably the pH should be driven to lower values than these, to give a good margin.

FIG. 2 shows a conventional domestic sewage water treatment system 20, in which a septic-tank (anaerobic) station 23 is followed by a tile-bed (aerobic) station 24. The aerobic station 24 serves two functions: (a) to expose the water to oxygen from the atmosphere, whereby the (dissolved) ammonium can oxidize to (dissolved) nitrate; and (b) to act as a soakaway, or drainage port, to enable the required volumes and flow-rates of water to physically enter the ground, without flooding or backing up. Of course, conditions vary at different sites, but generally it may be regarded that the size of the aerobic station 24 was designed more according to the requirements of the aerobic station in its function of exposing the water, for an adequate residence time, to the atmosphere, than by the requirements of its function as a drainage port.

Conventionally, in a domestic system, the aeration station 24 is a tile-bed soakaway, comprising gravel through which the water soaks downwards and into the groundwater below. Provided the water table 25 is a few meters below the tile-bed, complete oxidation can usually take place. Sometimes, the water released into the ground from a well-performing tile-bed can be quite acidic, if the oxidation has been complete enough to cause the pH to drop. However, if the water is hard, or if the ground under (or in) the tile bed is calcareous, the pH is buffered against falling to the lower levels.

It is not practically possible to add the treatment system of the invention onto a conventional aerobic tile-bed 24, of the simple kind as shown in FIG. 2. In the invention, the removal of the phosphate cannot start until after the ammonium has been (almost) completely nitrified, and in the conventional system the nitrified water is already soaked into the ground, by the time the nitrification reaction is completed. Preferably, in the invention, the nitrified water must be physically available after it has been completely oxidized, and a tile-bed 24 is no use because the nitrified water from a tile-bed has already passed into the ground. The invention requires that the phosphorus treatment commences only after the water has been aerated and fully oxidized, and is at low pH.

Figure 3:
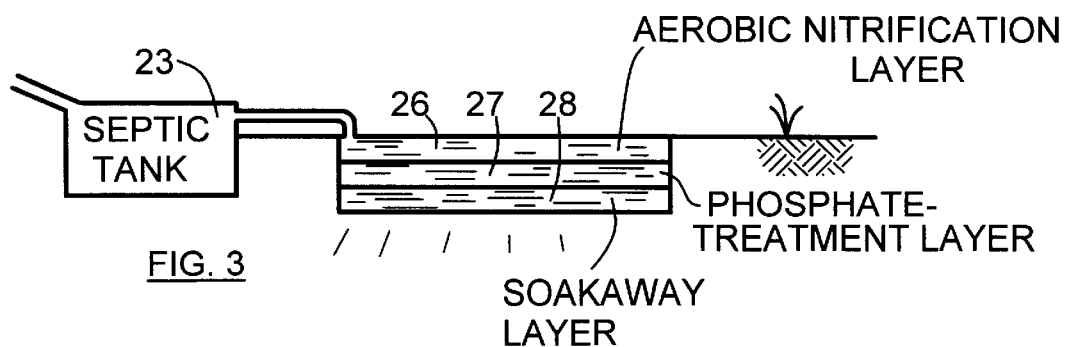
FIG. 3 is a diagram of a domestic sewage water treatment system, having a means for alleviating phosphorus that accords with the present invention.

In one preferred approach, the aeration station is of the above-ground type, SO the effluent water from the aeration station can be collected, and fed to the phosphorus treatment station. FIG. 3 shows another preferred approach, in which the components of the aerobic nitrification station 26 are in (or rather, on) the ground, but here the phosphorus treatment station 27 has been installed underneath the aerobic nitrification station 26.

In FIG. 3, the components of the treatment system that lie functionally after the septic tank 23 are stacked one above the other. The ammonium-laden (and phosphorus-laden) water from the septic tank 23 percolates down:

first, through an atmosphere-exposed aeration layer 26, in which complete nitrification takes place, and the pH drops to 5.5 or less (and preferably to 5 or less);

then through a phosphorus-treatment layer 27, in which (a) the low-pH water passes through aluminum hydroxide, picking up $Al^{3+}$ ions into solution, whereupon (b) the phosphorus precipitates out as aluminum phosphate;

and then through a drainage port layer 28, in which the now-clean (but still acidic) water enters the ground. (The drainage layer 28 can be omitted, as a separate layer, in cases where the phosphate-treatment layer 27 can be so engineered as to be suitable for discharging the water directly.)

In the situation of FIG. 3, as is encountered in many situations, sand/gravel might be available locally, but it might contain some limestone. (As mentioned, if the water being treated is too hard (calcareous), the pH will not fall, and the phosphorus-treatment system of the invention cannot be used—but there are many sites at which the water supplied to the site is soft enough, but in which the sand/gravel available at the site contains limestone.) If the local sand/gravel contains limestone, the local sand/gravel cannot be used in the aerobic layer 26, nor in the phosphorus-treatment layer 27. For these layers, if limestone-free sand is not available, it will have to be specially trucked in. The invention is therefore most suitable for use at sites where the local sand/gravel is limestone-free.

The aerobic layer 26 comprises just the plain limestone-free sand/gravel. The layer 26 is extensive enough and deep enough for the oxidation-nitrification reaction to take place completely. The designer of the system should over-engineer the aerobic layer 26 somewhat, to ensure that the nitrification is complete enough that even the last few percent of ammonium is oxidized. Often, in conventional systems, for example if the terrain is difficult, a designer will try to save a little on the aerobic station, on the grounds that a little ammonium remaining in the water will do no harm; but in the invention, as mentioned, it is very important that nitrification be thorough and complete, and the designer should be sure not to skimp on the aerobic layer 26.

The phosphorus-treatment layer 27 comprises the same limestone-free sand as in the aerobic layer 26, but now the grains of sand are given a coating of gibbsite. This coating can be pre-applied, e.g in a factory, prior to the sand being shipped to the site, or the coating can be applied to the sand, actually at the site. The coating is applied by placing the grains of sand in (neutral pH) water containing an excess of alum (aluminum sulphate), whereby aluminum hydroxide precipitates onto the grains, to the desired thickness.

Some natural sands contain enough gibbsite already to be directly suitable for use in the invention. If such are available, of course that can lead to cost savings.

The designer will usually prefer not to use just gibbsite itself, as the treatment layer 27, because that would be prone to clogging. Providing the gibbsite as a coating, on (inert) grains of sand or gravel is advantageous because, although the phosphate, when it precipitates, precipitates onto the grains, the phosphate is then taking the place of the hydroxide that has just dissolved off the grains. Therefore, the tendency of the treatment layer 27 to become clogged with precipitated phosphate is reduced. Of course, the layer 27 does not last for ever, in that eventually the gibbsite is depleted. But the layer can be expected to remain functional up until then, and not to become clogged with precipitated phosphate.

There need be no definite demarcation between the aerobic layer 26 and the phosphorus-treatment layer 27, and in fact all the sand/gravel in the two layers can comprise the gibbsite-coated grains, as described for the treatment layer 27. The gibbsite in the aerobic layer 26 will remain undissolved, until oxidation has progressed far enough for the pH to fall, as described.

Once the phosphorus treatment has taken place, there is now no need for the water to remain acidic, and indeed it is an advantage for the pH now to rise to more neutral levels before passing into the groundwater. Therefore, the bottom or drainage layer 28 can, and preferably should, contain limestone, to raise the pH. In cases where limestone is not available locally, it will probably not be worth specifically trucking it in, for the drainage port layer, but this can be done if discharging acidic water is a special problem. Of course, the designer should see to it that the pH of the water is not raised (by exposing the water to limestone) until all the phosphate in solution has had a chance to precipitate.

There are many prior art designs for above-ground aeration stations, including sand boxes, trickle filters, and the like. In the invention, the requirement is that the aerobic station be effective to oxidize the ammonium to a level at which the pH can fall, but apart from that, the invention imposes no particular design restrictions as to the structure of the aerobic station.

Figure 4:
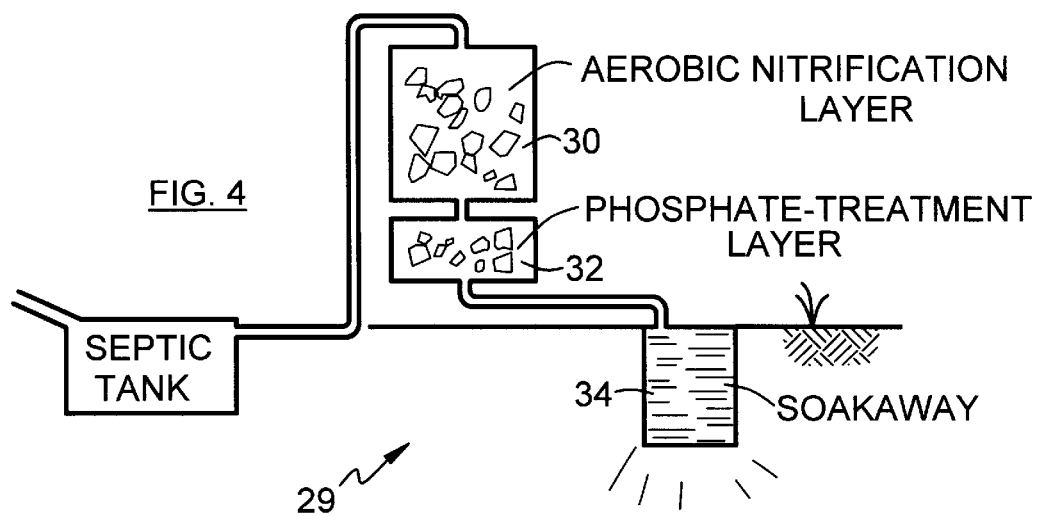
FIG. 4 is a diagram of another domestic sewage water treatment system, having another means for alleviating phosphorus that accords with the present invention.

FIG. 4 shows a domestic sewage treatment facility 29, in which the aeration station 30 comprises a heap of blocks of foam, as described in patent publication U.S. Pat. No. 5,707,513 (Jowett). Again, the aeration station 30 should be over-engineered to the extent that water emerging from the station is well-oxidized, to the extent that its pH is consequently low. In FIG. 4, the oxidized water may be collected, and piped to the phosphorus-treatment station 32.

The phosphorus treatment station 32 may also comprise blocks of foam. The gibbsite can be placed into the pores of the foam by the technique, as described in patent publication U.S. Pat. No. 5,997,747 (Jowett), of placing the blocks of foam into water containing grains of gibbsite, and then repeatedly squeezing and releasing the blocks. The solid particles of gibbsite are thereby drawn into the pores of the foam, and become distributed more or less homogeneously throughout the blocks.

Again, all the blocks of foam, i.e the foam in both the aerobic station 30 and the phosphorus-treatment station 32, can be provided with the gibbsite, if desired, and there need be no physical separation between the two layers. Any gibbsite that is encountered by water in which the pH has not yet dropped will be wasted, but the wasted gibbsite at least will do no harm.

Finally, the treated water is discharged into the ground by means of a drainage port 34. This can be a sand soakaway or tile-bed, or one of the many more or less sophisticated designs of drainage soakaway that have been proposed and used over the years. The water entering the soakaway 34 is completely nitrified, and phosphate-free, but it is over-acidic; if the designer needs to address that, he can do so e.g by incorporating some limestone into the soakaway 34.

In designing a sewage treatment system which has a facility for precipitating phosphate out of the water, it should be borne in mind that the precipitated phosphate usually cannot just be left in the ground, for ever. That is to say, it may be required, by the authorities, that provision be made for digging up the phosphate deposits, and taking them away for disposal. Therefore, a treatment system which left the precipitated phosphate deposits spread widely and thinly over a large area would not be favoured, as compared with a system that concentrated and confined the phosphate deposits in a small, accessible, area.

Thus, although, as described, it can be arranged that there need be little demarcation between the aerobic layer and the phosphorus treatment layer from the standpoint of the functional difference between the two layers, it can be beneficial to keep the layers separate from the standpoint of confining the phosphate deposits in a particular defined area. If this is done, then, when the system is replenished, only the material comprising the used phosphate-treatment layer need be carried away for disposal. The material that comprises the aerobic layer, given that it contains no gibbsite, cannot contain any phosphate, and therefore can remain, and can be re-used.

Of course, if the phosphorus treatment layer is directly underneath the aerobic layer, the aerobic layer will have to be removed anyway in order to get at the phosphate-treatment layer, when the time comes for replenishment. Therefore, designs in which the phosphate-treatment layer can be physically accessed, and removed, without disturbing the aerobic layer or the soakaway, may be preferred.

By keeping the three layers separate, also, the design of each layer need not be compromised by the physical limitations and requirements of the other layers. For instance, as mentioned, the aerobic layer, with its requirement for complete oxidation, has the need to be large (indeed, over-large) in terms of horizontal area, and shallow in terms of depth. The phosphate-treatment layer, on the other hand, has no such requirement to be wide and shallow, but preferably this layer should be removable, and therefore small and confined. The drainage layer, in turn, has the requirement of providing a large area of contact with the surrounding ground, through which, and by means of which, water can soak into the surrounding ground without disruption. Depending on the nature of the ground, the drainage requirements can range from very demanding to very simple. Thus, the physical requirements of the three layers are different, and, in a particular case, it may or may not be possible to integrate the different requirements with each other.

As described, the phosphate-treatment system of the invention involves lowering the pH of the water, and involves adding a source of a metal, e.g aluminum hydroxide, to the water, which dissolves to a sufficient concentration as to provide enough dissolved metal to cause (almost) all the phosphate to precipitate. It might be considered that this situation could have arisen in previous systems, without the deliberate intention of the designer, especially since aluminum hydroxide does tend to be present whenever aluminum is in solution. However, although complete oxidation has of course sometimes been accomplished, it has not been common for designers to worry whether the last one or two percent of ammonium slipped through without being nitrified. Secondly, even if the oxidation has been complete, it has not been common for there to be no buffering minerals present, either in the water or in the treatment medium, to prevent the pH from falling. Similarly, although aluminum hydroxide is present in large quantities in water into which alum has been dumped, the hydroxide cannot dissolve, at the neutral pH levels, to anywhere near the concentration needed to make any difference to the phosphate concentration. Thus, it is only when the conditions as described are deliberately engineered that the treatment system can arise, and can be effective.

It may be noted that the previously-mentioned patent publication U.S. Pat. No. 5,997,747 teaches a system for taking phosphorus out of water. However, in that system the treatment material was iron oxide. The iron oxide was provided because of its properties as an adsorbent. The present invention works, not by sorption, but by chemical precipitation reactions. But in '747, the phosphate ions are taken out of the water by adsorption onto a sorbing mineral—i.e iron oxide. The iron does not enter solution, there is no chemical reaction to produce iron phosphate, and the pH level is (more or less) irrelevant.

It might be considered that if aluminum hydroxide will release enough $Al^{3+}$ ions into solution at low pH to snag all the dissolved phosphate, and precipitate it as aluminum phosphate, that Fe might do the same. Fe and Al theoretically have more or less the same pH-solubility properties. In fact, when wastewater is completely oxidized, so as to drive the pH down, in the presence of iron hydroxide, the dissolved phosphate does not actually precipitate out as iron phosphate. What happens is that Fe does not always enter solution predictably, as does Al in these conditions. The theoretical thermodynamic calculations that say that Al will dissolve to such and such a concentration in water of a given pH are, by and large, followed in real life; but the same calculations with Fe, for some reason, are not well followed. With iron, it seems there must be some other reaction system operating, which makes the dissolvability of iron unpredictable. This, in turn, makes iron an unfavoured material for use in the present invention.

Another example of relevant art is patent publication U.S. Pat. No. 5,876,606 (Blowes), which shows a system for combining adsorption of the phosphate with chemical treatment. However, in this case the treatment provides a means, not for lowering, but for raising, the pH of the water. The phosphate is being precipitated as calcium phosphate, which, unlike aluminum phosphate, is quite soluble at low pH and only comes out of solution (precipitates) at high (alkaline) pH levels.

One of the features of the invention lies in the recognition that (nearly) all the phosphate can be made to precipitate out at a pH of 5.5 or 5, i.e in the pH range that can be achieved reasonably economically, and without further complications. If the desired precipitation only occurred at a pH of 2, for example, the invention could hardly be practical. It is recognised that the 5.5 or 5 level can be achieved simply by promoting the oxidation reaction to be a little more complete than has traditionally been done, whereby the invention does not require the development of major new chemical-engineering systems. It is recognised that, at the 5.5 or 5 pH levels, the concentration of the dissolved aluminum hydroxide is only just a little in excess of that required to cause (nearly) all the phosphate to precipitate, and that, at these pH levels, there is not a huge excess of hydroxide left in solution, which might later precipitate out downstream as the water naturally became more neutral.

What is claimed is:

1. Procedure for treating wastewater containing dissolved ammonium and dissolved phosphate, including:
    procuring oxidation of the ammonium to nitrate, to such a complete extent that the pH of the water falls to 5.5 or less;
    excluding buffer-substances from the water, and preventing buffer-substances from entering the water, being substances which would prevent the pH of the water going down to 5.5 or less;
    providing a body of a treatment material, and passing therethrough the water in which the pH has fallen to 5.5 or less;
    wherein the treatment material is solid in form, and the body of treatment material is porous and permeable to the passage of waste therethrough;
    the treatment material comprises or includes aluminum hydroxide;
    whereby the phosphate precipitates, as aluminum phosphate, onto the body of treatment material;
    and then discharging the wastewater that has passed through the body of treatment material.

2. Procedure of claim 1, wherein the aluminum hydroxide is so provided and arranged that its level of solubility in water at a pH level of 5.5 is such that:
    where the water contains dissolved phosphate, in equilibrium with the aluminum hydroxide, a major proportion of the metal that goes into solution is used up in precipitating substantially all the dissolved phosphate as a solid phosphate of aluminum;
    whereby none, or only an insignificant amount, of the dissolved phosphate remains in solution;
    and whereby only a minor proportion of the aluminum remains, after substantially all the phosphate has precipitated as the aluminum phosphate, in a form other than the precipitated phosphate.

3. Procedure of claim 1, including also the step of excluding the buffer-substances from contact with the water until the phosphate has precipitated, but of then passing the water over or through a buffer-substances prior to discharging the water.

4. Procedure of claim 1, wherein the said pH level of 5.5 or less is 5 or less.

5. Procedure of claim 1, including discharging the treated water by collecting the treated water and conducting it away, in a conduit.

6. Procedure of claim 1, including discharging the treated water by infiltrating it into the ground.

7. Procedure for treating wastewater containing dissolved ammonium and dissolved phosphate, wherein the procedure includes:
    providing an aerobic oxidation and nitrification station, and passing the wastewater therethrough;
    so structuring and operating the nitrification station as to procure nitrification of the ammonium to such a complete extent that water exiting the nitrification station is at a pH level of 5.5 or less;
    providing a phosphorus treatment station, and providing a body of aluminum hydroxide therein;
    wherein the aluminum hydroxide is in the form of a solid mineral;
    wherein the body of aluminum hydroxide is porous and permeable to the passage of water therethrough;
    passing the nitrified water from the aerobic station through the permeable body of aluminum hydroxide in the phosphorus treatment station, whereby the dissolved phosphate precipitates as an aluminum phosphate mineral, and whereby the concentration of dissolved phosphate in water emerging from the phosphorus treatment station is substantially reduced;
    excluding buffer-substances from the water in the nitrification station and from water in the phosphorus treatment station, and preventing buffer-substances from entering the water, being buffer-substances that would prevent the pH of the water going down to 5.5 or less.

8. Procedure of claim 7, wherein the body of aluminum hydroxide in the phosphorus treatment station comprises a permeable body of sand grains, the grains having a coating of gibbsite.

9. Procedure of claim 7, wherein the nitrification station includes a body of solid material, the surface area of which is exposed to air, and the procedure includes sprinkling the water to be nitrified over the solid material in such a manner that the water is thoroughly exposed to the air, and is so exposed for long enough that nitrification is complete.

10. Procedure of claim 7, wherein the wastewater entering the nitrification station contains a small enough concentration of buffer-substances as does not prevent the lowering of the pH of the water to 5.5.

11. Procedure of claim 7, wherein, in the phosphorus treatment station:
   the pH of the water is high enough;
   and the quantity of the aluminum hydroxide mineral is large enough;
   that the rate at which the aluminum hydroxide dissolves in the water is slow enough for the body of the mineral to remain, as a solid body, for a period of at least many months.

12. Procedure of claim 7, wherein:
   the procedure includes providing a drainage soakaway station, and of passing treated water from the phosphorus treatment station thereto;
   and the drainage soakaway station is effective to discharge the water into the ground substantially without flooding or backing-up.

13. Procedure of claim 12, wherein:
   the nitrification station, the phosphorus treatment station, and the drainage soakaway station are physically separated from each other;
   and the procedure includes passing the water from station to station, in turn, via water conduits.

14. Procedure of claim 12, wherein the drainage soakaway station includes a porous body of a material that, when the water passes therethrough, increases the pH-level of the water.

15. Procedure of claim 7, wherein the water to be treated is water from a domestic septic tank.

16. Apparatus for treating wastewater containing dissolved ammonium and dissolved phosphate, in combination with a body of wastewater undergoing treatment, including:
   an oxidation station for procuring oxidation of the ammonium to nitrate;
   the oxidation station includes a means for excluding buffer-substances from the body of wastewater, and for preventing buffer-substances from entering the body of wastewater, being substances which would prevent the pH of the body of wastewater going down to 5.5 or less;
   the oxidation station is arranged to endure that the oxidation of the ammonium is so complete that the pH of the body wastewater actually falls to 5.5 or less;
   the apparatus includes a phosphorus treatment station, containing a body of aluminum hydroxide;
   the aluminum hydroxide is in the form of a solid material;
   the body of aluminum hydroxide is porous and permeable to the passage of water therethrough;
   the phosphorus treatment station includes a means for excluding buffer-substances from the body of wastewater, and for preventing buffer-substances from entering the body of wastewater, being substances which would prevent the pH of the body of wastewater from going down to 5.5 or less;
   the body of wastewater in which the pH has actually fallen to 5.5 or less is present in, and undergoing treatment in, the body of aluminum hydroxide, on a passing through basis, whereby the dissolved phosphate precipitates as an aluminum phosphate mineral therein;
   and the apparatus includes a means for discharging the water that has passed through the body of aluminum hydroxide.

* * * * *